US008890877B2

(12) United States Patent
Fu et al.

(10) Patent No.: US 8,890,877 B2
(45) Date of Patent: Nov. 18, 2014

(54) UPDATING FIRMWARE IN A DISPLAY DEVICE USING A SERIAL BUS

(75) Inventors: Mark Yi-Li Fu, Cupertino, CA (US); Dale A. Herman, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 1051 days.

(21) Appl. No.: 12/372,402

(22) Filed: Feb. 17, 2009

(65) Prior Publication Data
US 2009/0222807 A1 Sep. 3, 2009

Related U.S. Application Data

(60) Provisional application No. 61/032,291, filed on Feb. 28, 2008.

(51) Int. Cl.
| G06F 13/14 | (2006.01) |
| G06F 9/44 | (2006.01) |
| G06F 15/00 | (2006.01) |
| G06F 15/76 | (2006.01) |
| G06F 9/445 | (2006.01) |

(52) U.S. Cl.
CPC .................................... *G06F 8/65* (2013.01)
USPC .............................. 345/520; 717/168; 712/29

(58) Field of Classification Search
CPC ..... H04N 21/4147; H04N 5/76; H04N 7/163; G06F 13/102; G06F 21/85; G06F 2213/0042; G06F 13/4027; G06F 3/14
USPC .......................................................... 345/520
See application file for complete search history.

(56) References Cited

U.S. PATENT DOCUMENTS

| 6,263,440 B1 | 7/2001 | Pruett et al. ..................... 726/35 |
| 7,158,153 B2 * | 1/2007 | Kang et al. ..................... 345/639 |
| 7,191,402 B2 | 3/2007 | Kim et al. | |
| 7,309,260 B2 | 12/2007 | Brower et al. | |

(Continued)

FOREIGN PATENT DOCUMENTS

| TW | 200634717 A | 10/2006 | .............. G09G 5/00 |
| TW | 1273400 B | 2/2007 | .............. G06F 12/00 |

OTHER PUBLICATIONS

"i2c-tiny-usb"; Till Harbaum-Impressum; Feb. 2007; 6 pages; obtained from Internet: http://www.harbaum.org/till/i2c_tiny_usb/index.shtml; retrieval date Sep. 4, 2012.

(Continued)

*Primary Examiner* — Kee M Tung
*Assistant Examiner* — Haixia Du
(74) *Attorney, Agent, or Firm* — King & Spalding L.L.P.

(57) ABSTRACT

Updating firmware of a display device. The display device may include a display screen and a video interface for receiving video signals from a host system and providing the video signals for display on the display screen. The display device may include a memory that stores program instructions for controlling operation of the display device. The display device may include a serial bus interface (e.g., a USB interface), which may receive signals from a host computer for updating the program instructions in the memory. A serial bus to first protocol bridge may receive the serial bus signals from the serial bus interface and convert the serial bus signals to signals of the first protocol. A display controller may update the program instructions in the memory of the display in response to the signals of the first protocol.

21 Claims, 4 Drawing Sheets

(56) References Cited

U.S. PATENT DOCUMENTS

| | | | |
|---|---|---|---|
| 7,405,742 B2* | 7/2008 | Evanicky et al. | 345/690 |
| 7,433,991 B2* | 10/2008 | Fujita et al. | 710/316 |
| 7,937,501 B2* | 5/2011 | Goodart et al. | 710/2 |
| 2007/0024607 A1 | 2/2007 | Chen | 345/204 |
| 2007/0261046 A1* | 11/2007 | Miller | 717/168 |
| 2009/0144715 A1* | 6/2009 | Chen et al. | 717/168 |

OTHER PUBLICATIONS

Taiwan Office Action, Application No. 098106515, 18 pages, Jun. 14, 2013.

* cited by examiner

US 8,890,877 B2

UPDATING FIRMWARE IN A DISPLAY DEVICE USING A SERIAL BUS

PRIORITY INFORMATION

This application claims benefit of priority of U.S. provisional application Ser. No. 61/032,291 titled "USB-I2C Bridge for Soft OSD and FW Upgrade in LCD Displays" filed Feb. 28, 2008, whose inventors were Mark Y. Fu and Dale A. Herman which is hereby incorporated by reference in its entirety as though fully and completely set forth herein.

FIELD OF THE INVENTION

The present invention relates to the field of displays, and more particularly to a system and method for updating firmware in a display device using USB.

DESCRIPTION OF THE RELATED ART

Many displays support protocols for performing display management operations (e.g., changing display properties). For example, a video card of a computer system may be configured to provide Inter-Integrated Circuit (I2C) signals to a display to change display properties. However, different manufacturers handle such signals in different manners, which can lead to incompatibilities between particular video cards and displays. Accordingly, display manufacturers have to test against numerous different video cards during testing, which can be costly. Accordingly, improvements in display management are desired.

SUMMARY OF THE INVENTION

Various embodiments are presented of a system and method for updating firmware in a display device using serial bus signals.

The display device may include a display screen and a video interface. The video interface may receive video signals from a host system and provide the video signals for display on the display screen.

The display device may include a display controller, a memory that stores program instructions for controlling operation of the display device, and a processor which is configured to execute the program instructions. In various embodiments, the display controller may receive the video signals from the video interface and provide corresponding signals for display on the display screen.

The display device may include a serial bus interface, which may receive serial bus signals (e.g., universal serial bus (USB) signals) from the host system. The serial bus signals may be for managing the display device. For example, the serial bus signals may include information for updating the program instructions in the memory, e.g., for updating firmware in the display device. Alternatively, or additionally, the serial bus signals may be for changing display properties, performing asset management, or performing calibration of the display device. In one embodiment, the serial bus signals may be provided in response to user input to management software (e.g., providing on screen display (OSD) functions) executing on the host system. For example, the management software may be implemented as program instructions stored in a memory medium of the host system.

The display device may include a serial bus to first protocol bridge, which may receive the serial bus signals and convert the serial bus signals to signals of the first protocol (e.g., I2C). Similar to the display controller above, the serial bus to first protocol bridge may include a processor and memory for converting the serial bus signals to the signals of the first protocol. However, in alternate embodiments, the serial bus to first protocol bridge may be a state machine (e.g., a hard-wired state machine) which may not include a processor and memory. In some embodiments, the serial bus to first protocol bridge may be included in a USB controller.

The display controller may perform the management functions described above based on the signals of the first protocol. For example, the display controller may update the firmware or program instructions of the display device, modify display properties, perform calibration, perform asset management, etc.

BRIEF DESCRIPTION OF THE DRAWINGS

A better understanding of the present invention can be obtained when the following detailed description of the preferred embodiment is considered in conjunction with the following drawings, in which.

Figure 1:
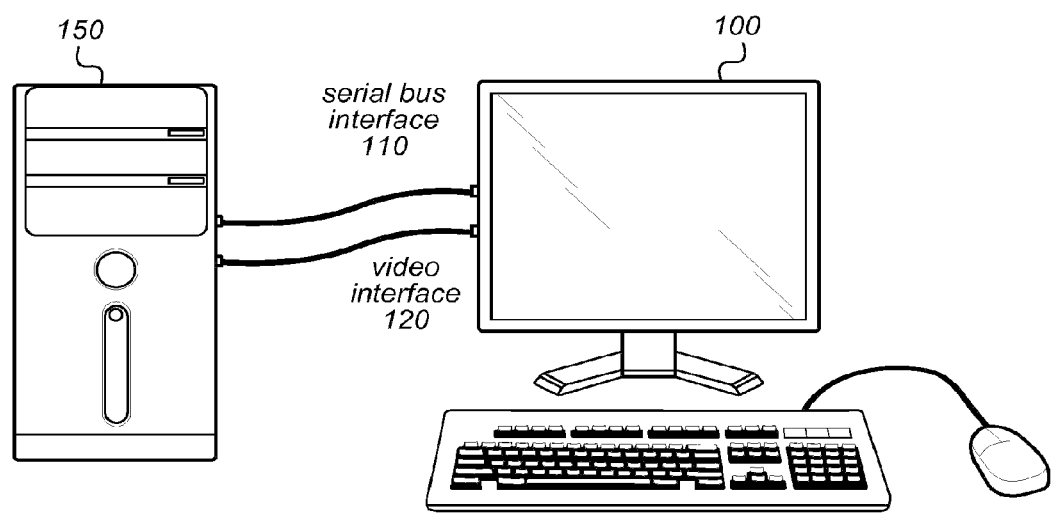
FIG. 1 illustrates an exemplary computer system and display device, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, flash memory, etc. The memory medium may comprise other types of memory as well, or combinations thereof. In addition, the memory medium may be located in a first device in which the programs are executed, or may be located in a second different device which connects to the first device over a network, such as the Internet. In the latter instance, the second device may provide program instructions or data to the first device for execution or reference. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Computer System and Display

FIG. 1 illustrates one embodiment of a display device 100 coupled to a host system 150. As shown, the display device 100 may include a video interface 120 which may receive video signals from the host system 150 for display on the display screen of the display device 100. Thus, the display device 100 may be configured to provide a video output for the computer system 150 using the video interface 120.

The display device may further include a serial bus interface 110 (e.g., which may be a universal serial bus (USB) interface). As described below, the display device may receive signals for managing the display device (e.g., for updating the firmware of the display device) over the serial bus interface 110. As used herein, the term "firmware" has the full breadth of its ordinary meaning. In some embodiments, the serial bus interface 110 may be a serial bus controller (e.g., a USB controller) which may provide a single endpoint or may be configured to support multiple USB end points. For example, the serial bus interface 110 may include a serial bus hub (e.g., a USB hub) which may allow various serial bus devices to be coupled to the display device 100 via the serial bus interface 110. In one embodiment, the keyboard and mouse, shown in FIG. 1, may be coupled to the serial bus hub of the display device 100. However, the serial bus hub may be separate from the serial bus interface 110 in various embodiments.

The display device 100 may be of any of various display devices. For example, the display device 100 may be a liquid crystal display (LCD) display device, a cathode ray tube (CRT) display device, a plasma display device, a DLP display device, a projection display device, etc.

The host system 150 may be any of various host devices; more specifically, the host system 150 may be a computer system and/or other types of host devices operable to perform various embodiments described herein. Alternatively, or additionally, the host system 150 may be a serial bus device, e.g., a USB device. For example, in one embodiment, the host system 150 may be a USB on-the-go (OTG) device which may be operable to act as a host and a device, e.g., depending on the situation. Thus, according to various embodiments the host system 150 may be any of various appropriate devices.

Additionally, as indicated above, the computer system 150 may include a keyboard and/or mouse, which may be serial devices. The keyboard and/or mouse may couple to the host system 150 via a variety of ways, e.g., directly to the host system 150 or via the display device 100, among other methods. Additionally, the host system 150 may include at least one memory medium on which one or more computer programs or software components may be stored. For example, the memory medium may store operating system software, as well as other software for operation of the host system 150. Various embodiments further include receiving or storing instructions and/or data implemented in accordance with the foregoing description upon a carrier medium.

Note that the above descriptions of the host system 150 and the display device 100 (and components therein) are exemplary only and other components and systems are envisioned.

Figure 2A:
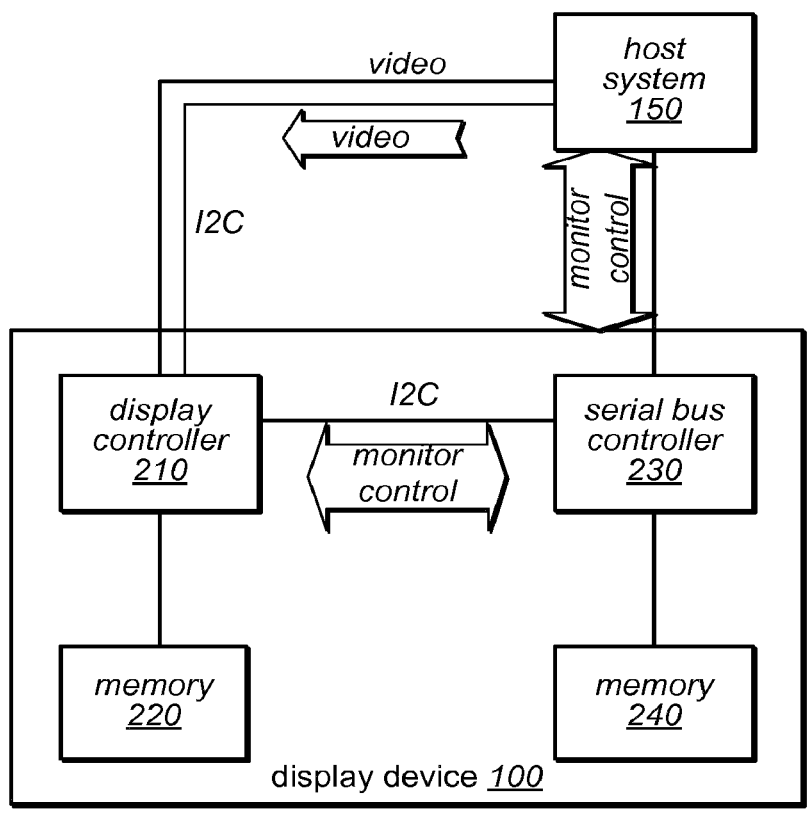
FIGS. 2A and 2B are block diagrams of an exemplary display device according to one embodiment.
Figure 2B:
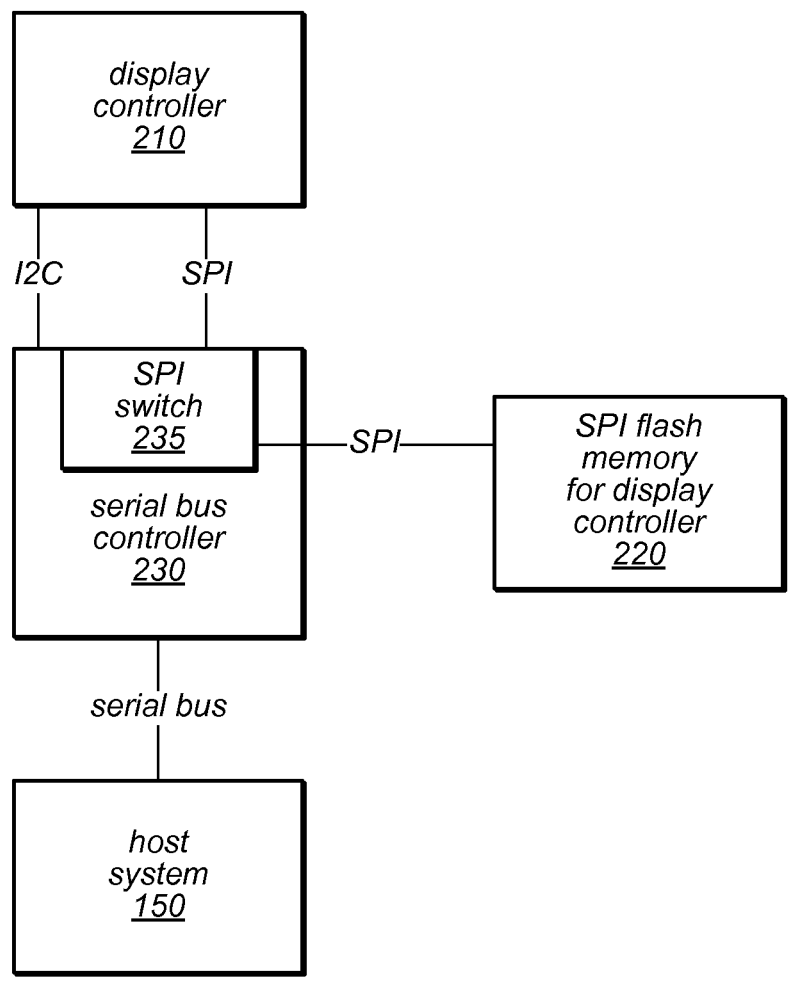

FIGS. 2A and 2B—Exemplary Block Diagrams of the Display Device

FIG. 2A is an exemplary block diagrams of the display device 100 coupled to the host system 150. As shown, the host system 150 may couple to the serial bus controller 230 (e.g., via a serial bus of the host system 150) and may separately couple to the display controller 210 (e.g., via a video card or circuit of the host system 150). As indicated above, the host system 150 may be coupled to the serial bus controller via a serial bus (e.g., USB such as USB 2.0) and may be coupled to the display controller 210 via a video protocol/cable (e.g., VGA, DVI, HDMI, component, etc.). The coupling between the host system 150 and the display controller 210 may support I2C communications over the video cable; however, according to various embodiments herein, the I2C communications between the host system 150 and the display controller 210 may not be used, and instead such communication may be provided via serial bus communication to the serial bus controller 230. Alternatively, the host system may be able to communicate using both the first protocol (e.g., I2C) via the video cable and serial bus signals via the serial bus cable. In such embodiments, the I2C signals from the host system 150 and the I2C signals from the serial bus controller 230 may be "tied together" before going into the display controller 210. Alternatively, the I2C signals may be selected, e.g., via an external analog switch, which may be controlled by the serial bus controller 230.

The display controller 210 may be configured to receive video signals and use them to provide images on the display screen of the display device. For example, the display controller 210 may receive video signals from the host system 150 (e.g., from an operating system, one or more applications executing on the host system 150, video output (possibly from another source than the host system 150), etc.) interpret or modify them based on display properties (e.g., brightness, contrast, saturation, color schemes, etc. if necessary) and provide them for display on the display screen.

The display controller 210 may include a processor and, as shown may be coupled to memory 220. Memory 220 may include program instructions (e.g., firmware) which may be executable by the processor of the display controller 210 to control operation of the display device (e.g., for causing display of video signals received by the host 150). The memory 220 may be a non-volatile memory such as flash memory or may be any type of memory medium, as desired. As described below, the host system 150 may provide serial bus signals to the serial bus controller 210 for updating the program instructions or firmware of the display controller 210 stored in the memory 220.

Similarly, the serial bus controller 230 may be coupled to a memory 240 which may store program instructions or firmware which may be executable by a processor of the serial bus controller 230 to control operation of the serial bus controller 230. Thus, the operation of the serial bus controller 230 may be dictated by the firmware or program instructions stored in the memory 240. Similar to above, the memory 240 may be a non-volatile memory such as flash memory or any type of memory medium, as desired.

In some embodiments, the serial bus controller 230 may support multiple endpoints and may, for example, include a serial bus hub, a memory card reader, and/or any of a variety of serial bus devices. For example, the serial bus controller 230 may include a plurality of ports where serial bus devices (e.g., keyboards, mice, printers, digital cameras, portable audiovisual players, etc.) may be connected. The serial bus controller 230 may also include one or more non-removable functions, such as an Ethernet controller, as desired.

As shown in FIG. 2A, the serial bus controller 230 may be coupled to the display controller 210. The serial bus controller 230 may be configured to communicate with the display controller 210 using a first protocol, such as I2C, although other protocols for internal communication of the display device are envisioned. Thus, the serial bus controller 230 may be configured to receive serial bus signals from the host system 150 and convert or interpret them to the first protocol and provide corresponding signals in the first protocol to the display controller 210 (e.g., to update firmware of the display controller 210, modify display properties of the display device, perform calibration, asset management, etc.). The serial bus controller 230 may also be configured to receive signals of the first protocol, convert them to serial bus signals, and provide those signals to the host system 150.

The serial bus controller 230 may enumerate (e.g., according to the USB (e.g., 2.0) specification) with the host system as specified to the display device or as a generic device (thereby avoiding the requirement of drivers specific to the display device). For example, the serial bus controller 230 may be identified as a Human Interface Device (HID), Mass Storage Class (MSC), or Communication Device Class (CDC) device, among native driver other possibilities.

FIG. 2B illustrates an alternative embodiment, where a second protocol (e.g., Serial Peripheral Interface Bus (SPI) may be used in the display device 200. For example, the display device 200 may utilize an SPI memory medium (e.g., a SPI flash memory), possibly for one or both of the memory mediums (220 and 240) shown in FIG. 2A. In some embodiments, the serial bus controller 230 may provide a secondary switch 235 to connect directly to the SPI bus for possibly faster updates, e.g., of the memory medium. For example, the serial bus controller 230 may either pass through the SPI interface from the display controller 210 to the corresponding SPI flash memory (for example) or the serial bus controller 230 may take over control of the memory medium in order to update the firmware/program instructions. In various embodiments, the I2C interface may still be required in order to inform the display controller 210 than an update to its firmware is occurring. Thus, FIG. 2B provides an alternative configuration for the memory of the display controller 210, possibly using an additional protocol, such as SPI.

Figure 3:
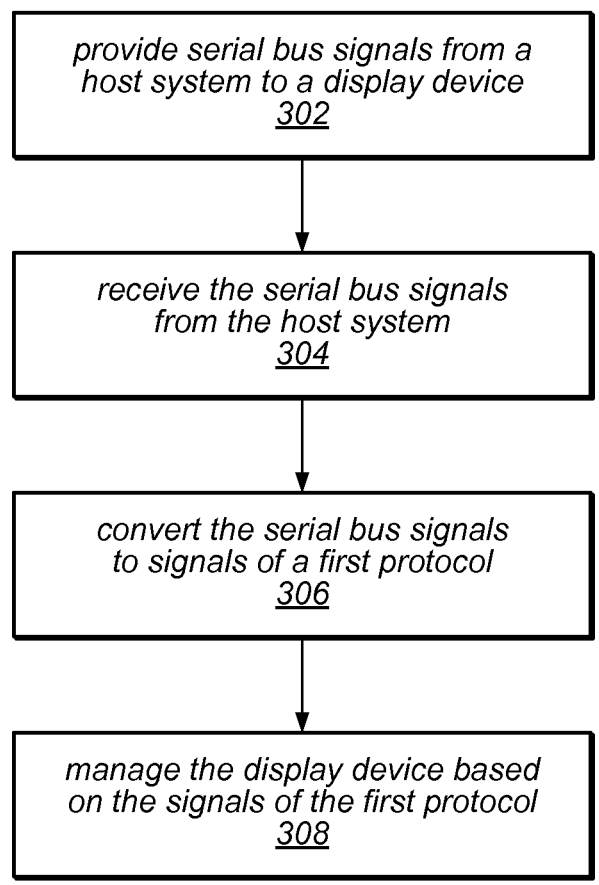
FIG. 3 is a flowchart diagram illustrating one embodiment of a method for updating firmware of a display device using a serial bus, according to one embodiment.

FIG. 3—Updating Firmware of a Display Device Using Serial Bus Signals

FIG. 3 illustrates a method for updating firmware of a display device using serial bus signals (e.g., USB signals). The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, serial bus signals (e.g., USB signals) may be provided from a host system (such as the host system 150 above) to a display device (such as the display device 100 above). For example, the host system may provide the serial bus signals to a serial bus interface (e.g., a port) of the display device. According to various embodiments, the signals may be provided from the host system in response to execution of management software executing on the host system. For example, the management software may be for managing the display device. Accordingly, in one embodiment, the user may provide input to the management software (e.g., to modify display properties or perform calibration) and the serial bus signals may be provided to the display device. In some embodiments, the management software may act as an on screen display (OSD) for the display device. Alternatively, or additionally, the serial bus signals may be for updating firmware of the display device.

In 304, the serial bus signals may be received by the display device. As indicated above, the display device may include a serial bus interface which may receive the serial bus signals (e.g., via serial bus cable). As also indicated above, the signals may be received over a pathway that is separate and distinct from a video signal pathway which may be provided from the host system (or a different host system) to a video interface of the display device. The video interface may be configured to receive video signals from the host system and provide the video signals for display (e.g., via a display controller) on a display screen of the display device.

In 306, the serial bus signals may be interpreted or converted to signals of a first protocol, e.g., I2C signals. 306 may be performed by a serial bus to first protocol bridge. In some embodiments, the serial bus to first protocol bridge may be comprised in a serial bus controller of the display device.

In 308, the signals of the first protocol may be used to manage the display device. More specifically, in one embodiment, the signals of the first protocol may be used to update or otherwise modify firmware or program instructions of the display device. For example, the display controller may include or be coupled to a memory which stores firmware or program instructions which are executable to perform the functions of the display controller, and the signals of the first protocol may be used to update or modify these program instructions. Thus, serial bus signals may be provided to the display device to update a firmware of the display device. In some embodiments, the firmware of the serial bus controller or bridge may be additionally or alternatively updated. The display controller or a processor of the display controller may be configured to receive the signals of the first protocol and update the firmware accordingly.

In some embodiments, the serial bus signals (and correspondingly, the signals of the first protocol) may be used to perform various other actions (e.g., in addition to or alternatively from modifying the firmware of the display device). For example, the signals may be for modifying a display property of the display device. More specifically, the signals may indicate that a brightness, saturation, contrast, color hue balance, vertical or horizontal display width or height, skew, or other display property should be changed. Accordingly, the display properties of the display device may be changed (e.g., by the display controller). These values may be provided by management software executing on the host system. For example, the management software may provide on screen display (OSD) features of the display device thereby allowing the user to interact with the OSD using a mouse rather than built in buttons on the display device.

Alternatively, or additionally, the serial bus signals may be used for calibration purposes. For example, a known image may be displayed on the display device and may be calibrated to correctly display the known image by communicating through the serial bus signals. In one embodiment, a device may be used to monitor changes made to display properties (e.g., by the display controller) of the display device and to perform calibration of the display device, e.g., in an automated fashion.

Furthermore, the serial bus signals may be used for asset management, e.g., in a company or network of computers. For example, the management software or host system may receive commands to turn on or off the display device, e.g., from a remote computer or administrator, and in turn, serial bus signals may be provided to invoke the requested action (e.g., to turn on or off the display device). Such actions may be performed by the display controller. As another example, asset management may pertain to serial number tracking, e.g., using the Extended Display Identification Data (EDID) of the display device. Further asset management functions are envisioned.

Thus, serial bus signals may be provided to the display device, the display device may convert the signals to a first protocol (e.g., I2C), and display management functions may be performed accordingly.

Note that while the above descriptions relate to provision of serial bus signals to the display device and the conversion of those signals to the first protocol, the display device may also be configured to operate in the reverse direction. For example, signals of the first protocol may be converted to serial bus signals and provided back to the host system. For example, where the user has interacted with the display device directly (e.g., to modify display properties), such information may be provided back to the host system.

Thus, according to at least some embodiments, the use of a well define serial bus protocol (such as USB) for communicating between the host system and the display may obviate incompatibility issues, e.g., incompatibilities associated with use of the I2C bus protocol. Since a well defined serial bus (e.g., USB) is used in place of I2C, I2C dependency issues are removed, which greatly reduces (or eliminates) testing time and cost, e.g., regression rest time and software release test coverage. This also reduces support costs associated with I2C incompatibility among displays and host systems. The USB bus also provides a faster connection between the host system and the display, thus allowing for additional features that may not be practical using I2C.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A display device comprising:
   a first and second connection operable to be connected to a host system;
   a display screen;
   a video interface, operable to be connected with the host system via the first connection and configured to receive video signals from the host system and provide the video signals for display on the display screen;
   a memory that stores program instructions for controlling operation of the display device;
   a serial bus controller comprising a universal serial bus (USB) device interface connected to the second connection, configured to receive USB signals from a USB host interface of the host system, wherein the USB signals comprise information for updating the program instructions in the memory;
   wherein the serial bus controller further comprises a USB to first protocol bridge, wherein the USB to first protocol bridge is configured to receive the USB signals from the host system and convert the USB signals to signals of the first protocol; and
   a display controller, configured to update the program instructions in the memory of the display in response to the signals of the first protocol and to receive the video signals from the video interface for display on the display screen.

2. The display device of claim 1, wherein the display controller is further configured to change display properties of the display screen based on the signals of the first protocol.

3. The display device of claim 1, wherein USB communication is provided based on user input to management software executing on the host system.

4. The display device of claim 3, wherein the management software provides on screen display (OSD) functions.

5. The display device of claim 1, wherein the display controller is configured to perform calibration based on the signals of the first protocol.

6. The display device of claim 1, wherein the first protocol is an Inter-Integrated Circuit (I2C) protocol.

7. The display device of claim 1, wherein the display controller comprises a processor, wherein the processor is configured to execute the program instructions stored in the memory.

8. The display device of claim 1, wherein the USB to first protocol bridge comprises a processor and a second memory, wherein the second memory stores program instructions for converting the USB signals to the signals of the first protocol.

9. The display device of claim 1, wherein the display controller is configured to perform asset management operations based on the signals of the first protocol.

10. The display device of claim 9, wherein the asset management operations include at least a serial number tracking function, wherein the serial number is an Extended Display Identification Data (EDID) of the display device.

11. A method for updating firmware of a display device, comprising:
   receiving, by the display device, universal serial bus (USB) signals via a USB interface, wherein the display device is configured as a USB device and the USB signals are provided by a USB host system and the USB signals comprise information for updating the firmware of the display;

converting, by the display device, the USB signals to signals of a first protocol;
modifying the firmware of the display device based on the signals of the first protocol; and
receiving video signals from the USB host system via a video interface of the display device and providing the video signals for display on the display screen.

12. The method of claim 11, further comprising:
receiving second USB signals for changing display properties of the display device;
converting the second USB signals to second signals of the first protocol; and
changing the display properties of the display device based on the second signals of the first protocol.

13. The method of claim 11, further comprising:
converting the second USB signals to second signals of the first protocol; and
performing asset management operations based on the second signals of the first protocol.

14. The method of claim 1 further comprising:
receiving second USB signals for performing calibration;
converting the second USB signals to second signals of the first protocol; and
performing calibration of the display device based on the second signals of the first protocol.

15. The method of claim 11, wherein the first protocol is an Inter-Integrated Circuit (I2C) protocol.

16. A method for updating firmware of a display device, comprising:
providing universal serial bus (USB) signals to a USB interface of the display device by a USB host, wherein the USB interface is configured as a USB device the USB signals comprise information for updating the firmware of the display device, wherein the USB signals are usable by the display device for conversion to signals of a first protocol, wherein the signals of the first protocol are usable to update the firmware of the display device;
providing second USB signals to a USB interface of the display device by the USB host, wherein the second USB signals comprise information for performing asset management of the display device; and
providing video signals to a video interface of the display device by the USB host, wherein the video signals are usable to provide images on a display screen of the display device.

17. The method of claim 16, wherein the first protocol comprises an Inter-Integrated Circuit (I2C) protocol.

18. The method of claim 16, further comprising:
providing second USB signals to the USB interface of the display device, wherein the second USB signals comprise information for changing display properties of the display device.

19. A non-transitory computer accessible memory medium storing program instructions for updating firmware of a display device, wherein the program instructions are executable by a processor to:
provide universal serial bus (USB) signals by a USB host system to a USB device interface of the display device, wherein the USB signals comprise information for updating the firmware of the display device;
wherein the USB signals are usable by the display device for conversion to signals of a first protocol, wherein the signals of the first protocol are usable to update the firmware of the display device; and provide video signals from the USB host system via a video interface of the display device.

20. The memory medium of claim 19, wherein the first protocol is an Inter-Integrated Circuit (I2C) protocol.

21. A system comprising:
a host device comprising a video connection and a universal serial bus (USB) interface;
a display device comprising a first connection coupled with the video connection of the host device and second connection coupled with the USB interface of the host device, the display device further comprising:
a display screen;
a video interface connected with the host device via the first connection and configured to receive video signals from the host device and provide the video signals for display on the display screen;
a memory that stored program instructions for controlling operation of the display device;
a serial bus controller comprising a USB device interface connected to the second connection, configured to receive USB signals from a USB host interface of the host device, wherein the USB signals comprise information for updating the program instructions in the memory;
wherein the serial bus controller further comprises a USB to first protocol bridge, wherein the USB to first protocol bridge is configured to receive the USB signals from the host device and convert the USB signals to signals of the first protocol; and
a display controller, configured to update the program instructions in the memory of the display in response to the signals of the first protocol and to receive the video signals from the video interface for display on the display screen.

* * * * *